(12) United States Patent
Fowler et al.

(10) Patent No.: US 8,779,346 B2
(45) Date of Patent: Jul. 15, 2014

(54) DIGITAL PIXEL SENSOR WITH REDUCED NOISE

(75) Inventors: Boyd Fowler, Sunnyvale, CA (US); Xinqiao Liu, Mountain View, CA (US)

(73) Assignee: BAE Systems Imaging Solutions Inc., Milpitas, CA (US)

( * ) Notice: Subject to any disclaimer, the term of this patent is extended or adjusted under 35 U.S.C. 154(b) by 260 days.

(21) Appl. No.: 13/471,384

(22) Filed: May 14, 2012

(65) Prior Publication Data

US 2013/0299674 A1 Nov. 14, 2013

(51) Int. Cl.
*H03K 17/78* (2006.01)

(52) U.S. Cl.
USPC .............. 250/214 DC; 250/214.1; 250/208.2; 257/431; 348/303; 348/304

(58) Field of Classification Search
USPC ...... 250/214.1, 208.1, 214 DC, 214 R, 208.2; 257/431; 348/294, 297, 302, 303, 304
See application file for complete search history.

(56) References Cited

U.S. PATENT DOCUMENTS

| 8,119,972 B2 * | 2/2012 | Lotto et al. ................. 250/214 R |
| 2011/0115663 A1 * | 5/2011 | Bogaerts ....................... 341/164 |
| 2012/0175499 A1 * | 7/2012 | Meynants et al. .......... 250/208.1 |

OTHER PUBLICATIONS

Andreou et al. "Noise Analysis and Comparison of Analog and Digital Readout Integrated Circuits for Infrared Focal Plane Arrays", 2009 IEEE, No. 978-1-4244-2734-5, pp. 695-700.*

* cited by examiner

*Primary Examiner* — Francis M Legasse, Jr.
(74) *Attorney, Agent, or Firm* — Calvin B. Ward

(57) ABSTRACT

An apparatus and method for forming a digital image are disclosed. The apparatus includes a plurality of pixel sensors and a controller. Each sensor includes a photodiode, a floating diffusion node that can be selectively connected to said photodiode or a reset voltage, and an analog-to-digital converter (ADC) connected to the floating diffusion node, the ADC converting a voltage on the floating diffusion node to a digital value. Each pixel sensor also includes an output circuit that connects the ADC to a bus. The apparatus also includes a controller that causes the ADCs to operate in parallel to convert the voltages on the floating diffusion nodes to the digital values in a time that is less than the time needed for the floating diffusion node to acquire ten electron equivalents of noise. The optional apparatus includes circuitry that allows correlated double sampling to be performed in each sensor.

21 Claims, 7 Drawing Sheets

DIGITAL PIXEL SENSOR WITH REDUCED NOISE

BACKGROUND

CMOS image sensors based on an active pixel design have gained wide acceptance in camera applications. In such sensors each pixel in the final image is generated by a pixel sensor that includes a photoreceptor that accumulates charge during an exposure. The accumulated charge is converted to a voltage by an output amplifier that is typically constructed from a source follower transistor that receives the charge at its gate and drives a bit line that is connected to the readout circuitry in the imaging array. The signal on the bit line is then digitized using an analog-to-digital converter (ADC) that is connected to the bit line.

In cameras that utilize global shutters, the image is projected on an array of pixel sensors after all of the photodiodes in the pixel sensors have been reset. All of the photodiodes accumulate charge in an amount that depends on the light intensity received by that photodiode. At the end of the exposure, the charge accumulated by each photodiode is transferred to a floating diffusion node in the pixel sensor, and the photodiode is isolated from the floating diffusion node, thereby ending the exposure. The charge remains on the floating diffusion node until the pixel sensor in question is readout. During the storage of charge on the floating diffusion node, the node accumulates additional electrons from noise sources in the array of pixels and the surrounding processing circuitry. The contribution of such "noise electrons" to the final image sensor intensity value depends on the amount of time the charge remains on the floating diffusion node. Compensation for this noise source remains a challenge in the search for designs that reduce the overall noise in CMOS imagers.

SUMMARY

The present invention includes an apparatus and method for forming a digital image. The apparatus includes a plurality of pixel sensors and a controller. Each pixel sensor includes a photodiode, a floating diffusion node that can be selectively connected to said photodiode or a reset voltage, and an ADC connected to the floating diffusion node, the ADC converting a voltage on the floating diffusion node to a digital value. Each pixel sensor also includes an output circuit that connects the ADC to a bit bus. The apparatus also includes a controller that causes the ADCs to operate in parallel to convert the voltages on the floating diffusion nodes to the digital values in a time that is less than the time needed for the floating diffusion node to acquire ten electron equivalents of noise. The optional apparatus includes circuitry that allows correlated double sampling to be performed in each of said pixel sensors.

DETAILED DESCRIPTION

Figure 1:
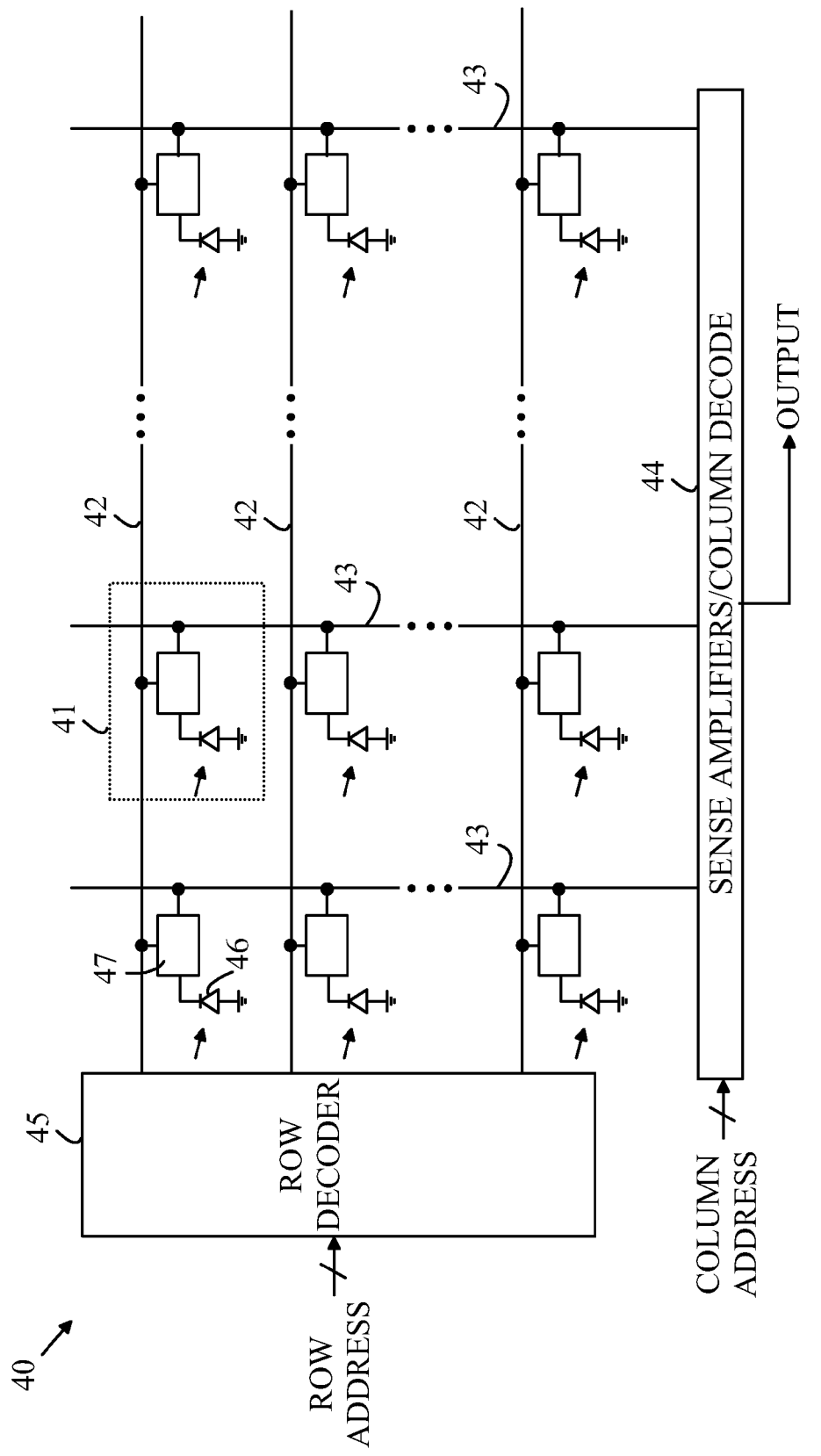
FIG. 1 is a block diagram of a prior art CMOS imaging array.

The manner in which the present invention provides its advantages can be more easily understood with reference to FIG. 1, which is a block diagram of a prior art CMOS imaging array. Imaging array 40 is constructed from a rectangular array of pixel sensors 41. Each pixel sensor includes a photodiode 46 and an interface circuit 47. The details of the interface circuit depend on the particular pixel design. However, all of the pixel circuits include a gate that is connected to a row line 42 that is used to connect that pixel to a bit line 43. The specific row that is enabled at any time is determined by a bit address that is input to a row decoder 45.

The various bit lines terminate in a column processing circuit 44 that typically includes sense amplifiers and column decoders. Each sense amplifier reads the signal produced by the pixel that is currently connected to the bit line processed by that sense amplifier. The sense amplifiers may generate a digital output signal by utilizing an ADC. At any given time, a single pixel sensor is readout. The specific column that is readout is determined by a column address that is utilized by a column decoder to connect the sense amplifier/ADC output from that column to circuitry that is external to the imaging array.

Figure 2:
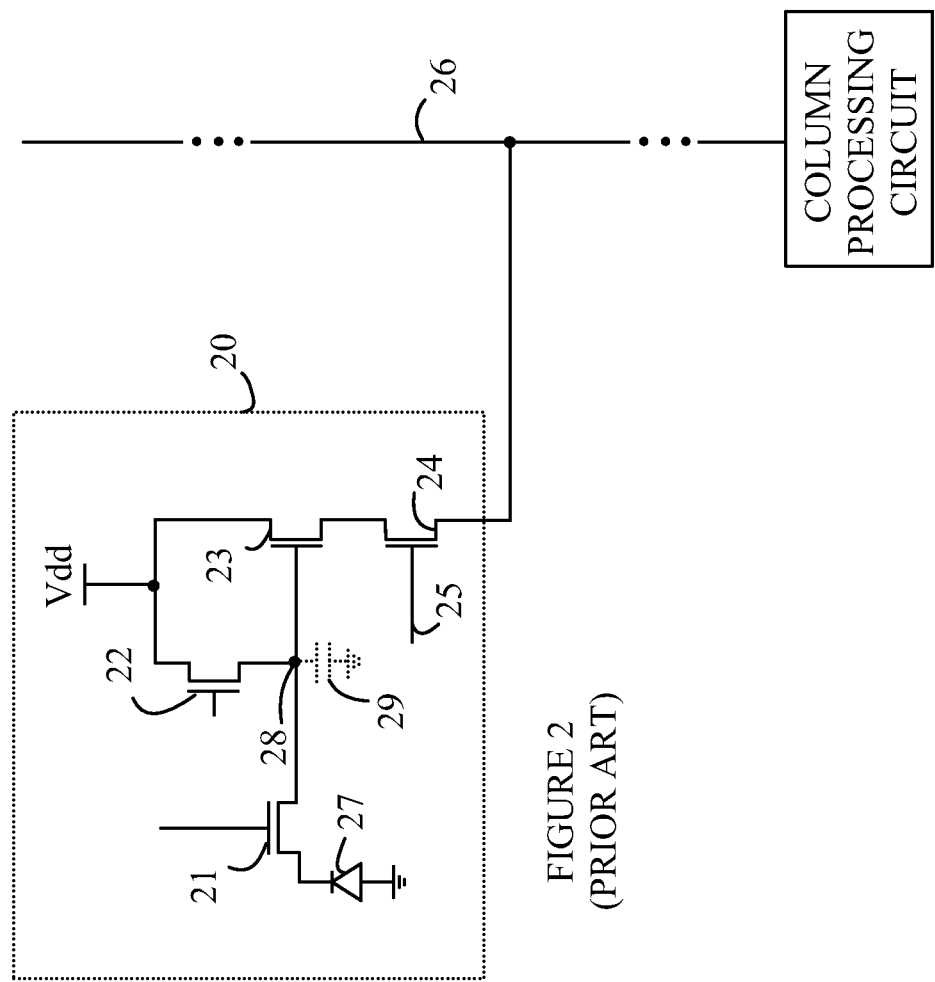
FIG. 2 is a schematic drawing of a typical prior art pixel sensor.

Refer now to FIG. 2, which is a schematic drawing of a typical prior art pixel sensor. Pixel sensor 20 includes a photodiode 27, which is preferably a pinned photodiode, that is coupled to a floating diffusion node 28 by gate 21. During the exposure of the imaging array to the image being recorded, charge accumulates in photodiode 27. The accumulated charge is transferred to floating diffusion node 28 by applying a signal to gate 21. The charge transferred to floating diffusion node 28 is converted to voltage by the parasitic capacitor 29 associated with the gate of transistor 23, which is connected as a source follower. Transistor 23 provides the gain needed to drive bit line 26 when pixel sensor 20 is connected to that bit line via a signal on row select line 25 that is coupled to the gate of transistor 24. Prior to transferring charge from photodiode 27 to floating diffusion node 28, the potential on gate 21 is reset to a predetermined potential via gate 22. However, there are small variations in the final charge on floating diffusion node 28 after the reset.

A procedure known as correlated double sampling is used to compensate for these variations. The potential on floating diffusion node 28 is then measured by connecting pixel sensor 20 to bit line 26. After this starting potential is measured, the charge that accumulated on photodiode 27 is transferred to floating diffusion node 28 and the potential on floating diffusion node 28 is again measured by connecting pixel sensor 20 to bit line 26. The difference in the signal between the two potential measurements is the light intensity value that is reported for pixel sensor 20.

As noted above, during the time the charge "sits" on floating diffusion node 28 prior to being readout, the charge is corrupted by electrons, or holes, that are generated in other pixels, the surrounding silicon, or the circuitry present in the decoders and other processing circuitry in the imaging array. Since the silicon in which the pixels are formed is exposed to light, photoelectrons and holes are generated in the underlying silicon. These noise charges migrate to the diffusion nodes and alter the charge on the diffusion nodes. The longer the photo-generated charge from the photodiode remains on floating diffusion node 28, the greater the corruption of the signal from the pixel sensor. Since the pixel sensors are readout one row at a time, pixel sensors in the last row to be readout accumulate more noise than pixel sensors that are readout earlier in the readout process. This variation in storage time complicates attempts to correct for the noise.

The noise that is accumulated on the floating diffusion node can be characterized in terms of the change in voltage on the node that would arise from one noise electron or hole moving onto the floating diffusion node. This level of noise will be referred to as an electron equivalent of the noise level. If the noise can be reduced to the point that the change in voltage is much less than the change in voltage that would occur if one electron were added or subtracted from the charge on the floating diffusion node, further improvements will not provide any benefit. In fact, the charge that is transferred to the floating diffusion node for any given light exposure will have a statistical variation with a standard deviation on the square root of N, where N is the average number of photoelectrons that are generated for the light exposure. This statistical noise is most problematic at low values of N where a noise level equivalent to a few electrons can contribute errors that are of the same level as the statistical noise.

Figure 3:
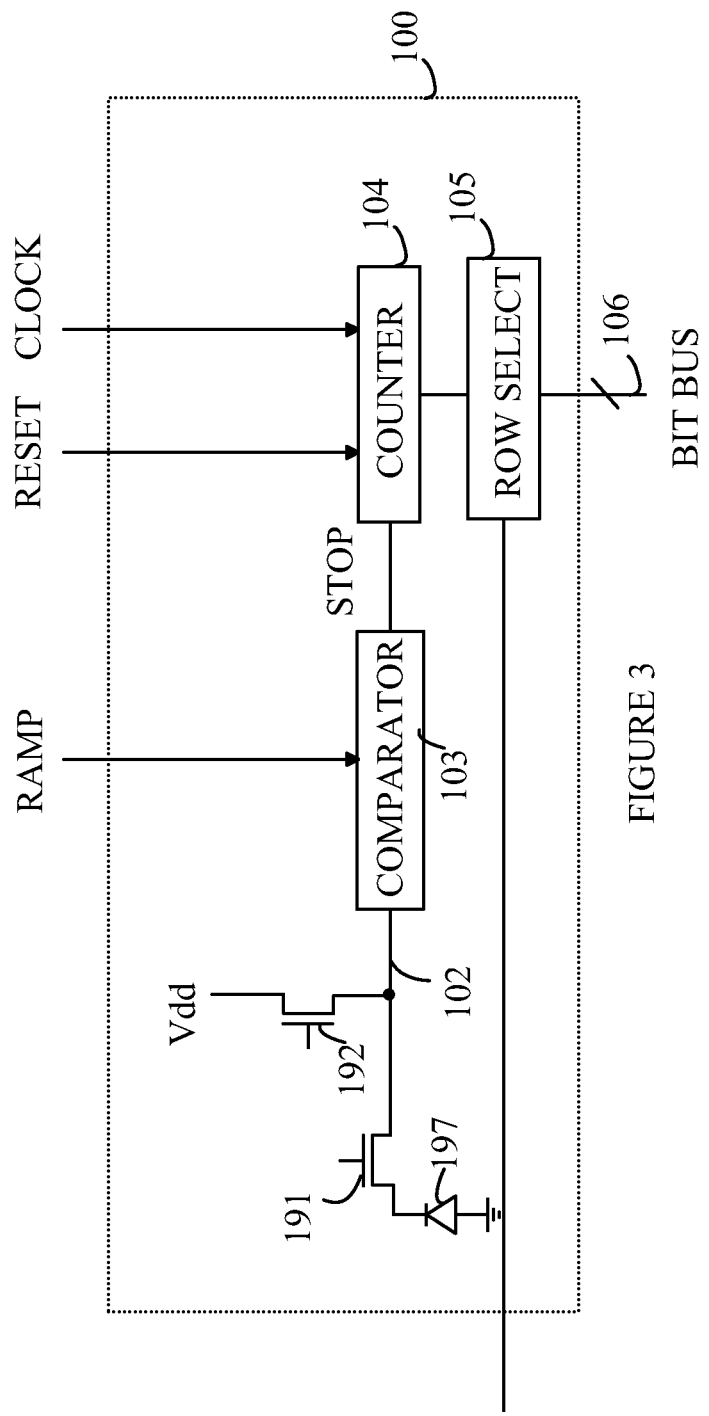
FIG. 3 is a schematic drawing of a pixel sensor that utilizes a distributed ADC according to one embodiment of the present invention.

The present invention reduces storage dependent noise and its variation with storage time by digitizing all of the pixel sensor signals in parallel and performing the digitization in a time that is small compared to the time in which the noise on the floating diffusion node exceeds ten electron equivalents, and preferably less than the time needed to exceed three electron equivalents. In a still further embodiment, the storage time is less than the time in which the noise on the floating diffusion node exceeds one electron equivalent. In effect, the present invention provides an ADC in each pixel sensor that operates on the charge generated in that pixel sensor. Refer now to FIG. 3, which is a schematic drawing of a pixel sensor that utilizes a distributed ADC according to one embodiment of the present invention. Pixel sensor 100 includes a photodiode 197 that is connected to a transfer gate 191 and a reset gate 192 that operate in a manner analogous to that described above. After the pixels in the array containing pixel sensor 100 have been exposed, the charge that accumulated on each of the photodiodes is digitized in parallel.

Since the digitization is carried out in parallel, only the process with respect to pixel sensor 100 will be explained in detail. However, it is to be understood that each pixel in the imaging array carries out the same process. At the start of the digitization process, the charge stored on photodiode 197 is coupled to node 102 by applying a signal to transfer gate 191 in parallel with the corresponding gates in the other pixel sensors in the array. Counter 104 is then reset and begins to count clock pulses while the potential on the other input of the comparator 103 is increased. The potential on the ramp line is linearly related to the count that has accumulated in counter 104. When the ramp potential is equal to the potential at node 102, the comparator 103 generates a stop signal that is applied to counter 104 and causes the counter to stop counting clock pulses. Hence, counter 104 is left with a count that is related to the potential at node 102. In this embodiment, the pixels are readout one row at a time using a row decoder that operates a set of row select switches 105 that connect the counter output to a bit bus 106 that is associated with the pixel sensors in the column in which pixel sensor 100 is located. The bit bus serves a function analogous to the bit lines described above, albeit the signal on the bit line is in digital format instead of the analog format described above. In this embodiment, the bit bus includes one line per bit in counter 104. Hence, the counter is readout in parallel down bit bus 106. While this embodiment utilizes a bit bus that reads out the counter bits in parallel, embodiments in which the bits in the counter are shifted down a single conductor bit line can also be constructed.

It should be noted that all of the data stored as an analog charge in the pixels is digitized at the same time; hence, the analog-to-digital conversion of the data is reduced to the time needed to digitize the charge in a single pixel sensor. Once the data has been digitized, the photodiodes can be reset by placing reset gate 192 and transfer gate 191 in the conducting state. A new exposure can then be commenced while the data stored in the counters is being readout. Since the data is in digital form, the readout time can be significantly less than the time needed to readout the analog signal from the source followers used in the above-described prior art systems.

Figure 4:
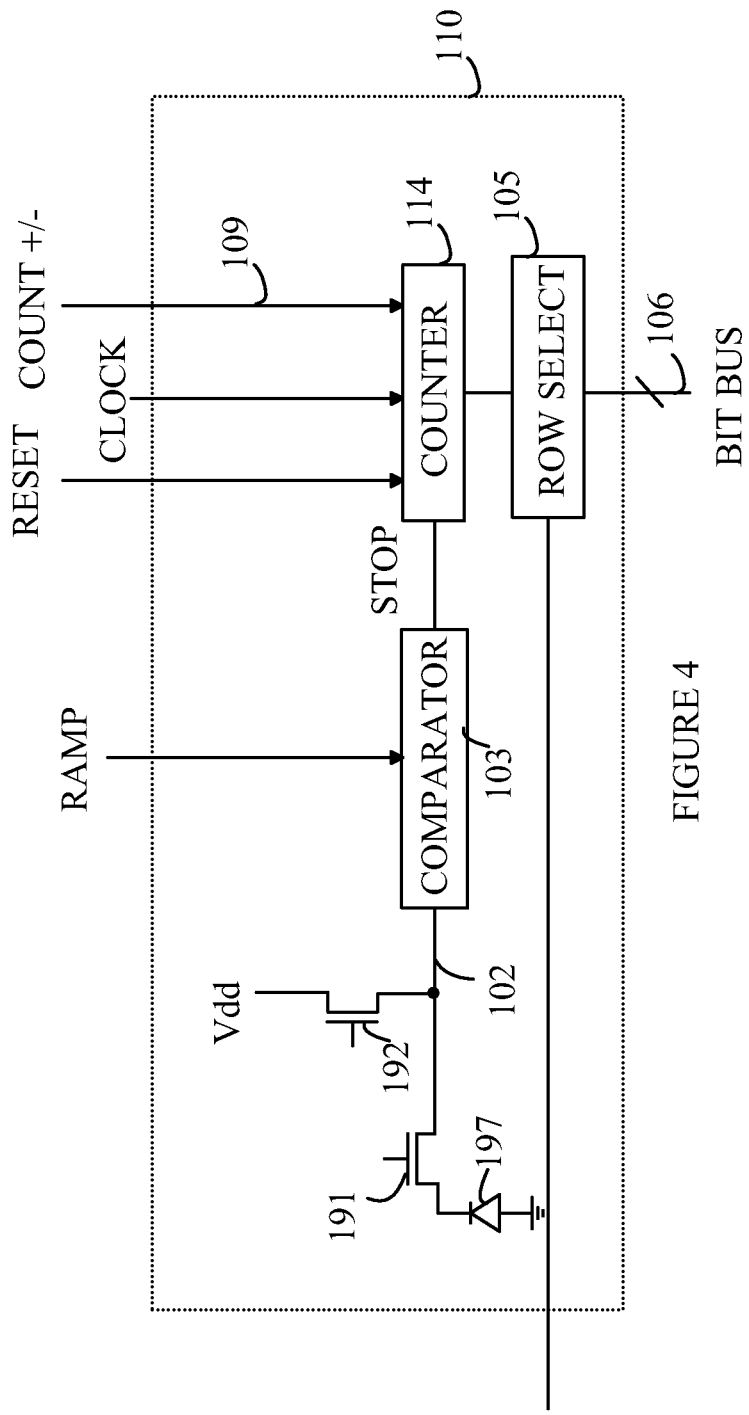
FIG. 4 illustrates a pixel sensor according to another embodiment of the present invention.

As noted above, variations in the reset potential on node 102 can also lead to noise in the final image. Embodiments of the present invention that carry out a procedure analogous to the correlated double sampling procedures described above can be utilized to reduce this noise. Refer now to FIG. 4, which illustrates a pixel sensor according to another embodiment of the present invention. Pixel sensor 110 utilizes an up/down counter 114. The direction of the count is controlled by a signal on control line 109 that is shared by all of the pixels in the imaging array. Prior to transferring the charge collected on photodiode 197 to node 102, node 102 is reset via reset gate 192. The potential on node 102 is then digitized and stored in up/down counter 114 in a manner analogous to that discussed above. In this phase of the readout, up/down counter 114 is reset to 0, and control line 109 directs up/down counter 114 to count up. After up/down counter 114 has been loaded with a count indicative of the potential on node 102 after the reset operation, the charge on photodiode 197 is transferred to node 102. The transferred electrons reduce the voltage on node 102. The voltage on node 102 is then digitized and subtracted from the count in up/down counter 114 by setting the control signal on control line 109 accordingly. When the signal on node 102 is less than the ramp voltage, the counting operation is stopped, and up/down counter 114 will be left with the corrected count indicating the charge transferred from photodiode 107 corrected for the reset noise on node 102. Other methods for combining the measured reset voltage with the voltage produced by the charge collected by the photodiode could also be used.

It should be noted that the resetting of node 102 and the loading of up/down counter 114 can be performed while photodiode 197 is accumulating charge during the exposure. The reset operation is preferably performed near the end of the image exposure so that the node will be reset and up/down counter 114 will be loaded just prior to the end of the exposure. Hence, node 102 will not have had time to accumulate a significant number of noise electrons prior to the charge from photodiode 197 being transferred to node 102.

While performing the digitization of the photodiode accumulated charge in parallel avoids the problems associated with the charge being stored on node 102 for varying amounts of time depending on the position of the pixel sensor in the array of sensors, to provide the desired overall noise reduction, the time between the resetting of node 102 and the completion of the digitization of the charge from node 102 should be as small as possible. In the following discussion, the time between the resetting of node 102 and the time the value on node 102 is digitized after the charge is transferred from photodiode 197 to node 102 will be referred to as the "digitization time".

In one aspect of the present invention, the digitization time is set to be less than the time needed to accumulate ten electron equivalents of noise. In another aspect, the digitization time is set to be less than the time needed to accumulate three electron equivalents. In a still further aspect of the invention, the digitization time is set to be less than the time needed to accumulate one electron equivalent of noise.

Figure 5:
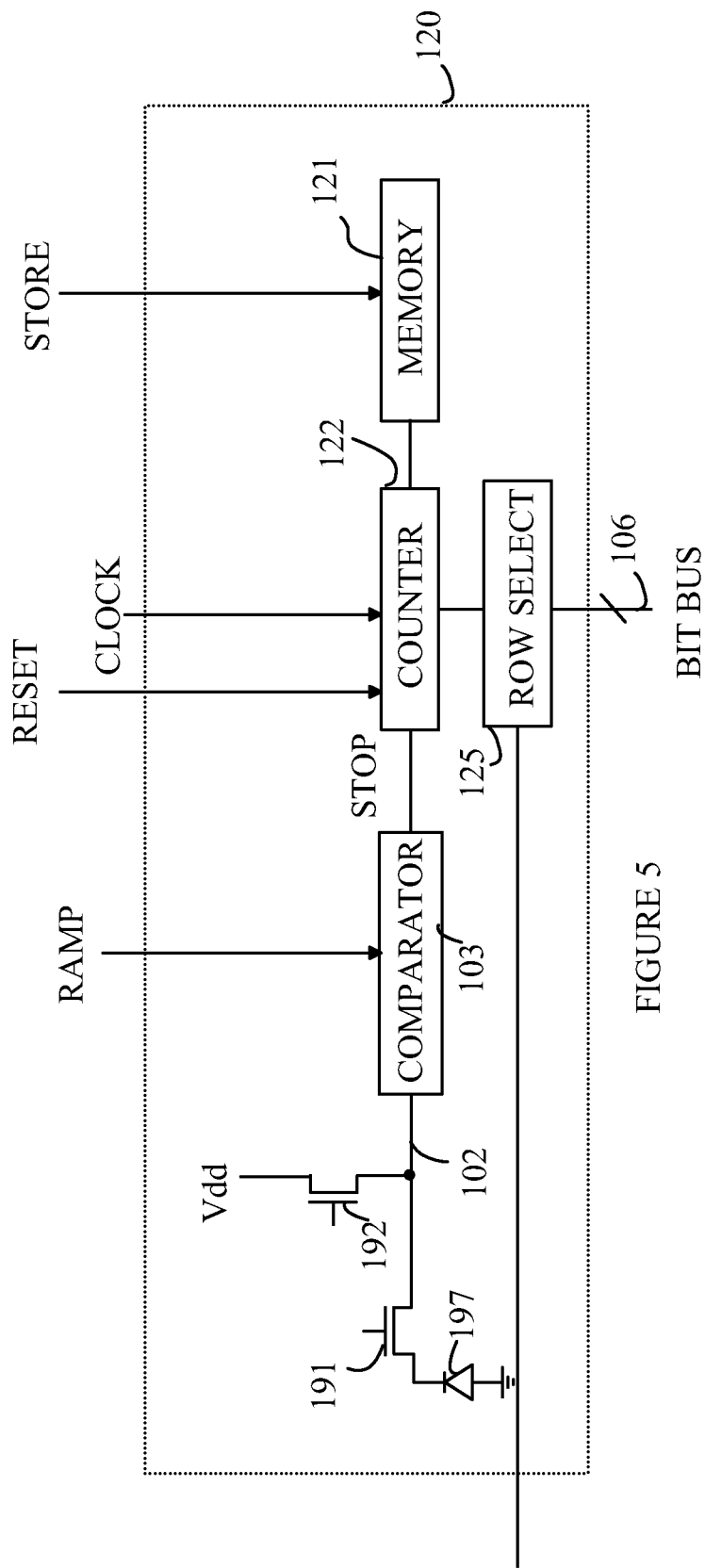
FIG. 5 illustrates another embodiment of a pixel sensor according to the present invention.

In the above-described embodiments of the present invention, the ramp used by the digitization circuitry is typically a linear ramp and the same ramp is used for digitizing both the reset potential and the actual signal from the photodiode. However, embodiments in which the ramp is non-linear and/or different ramps are used during the double sampling procedure can provide additional benefits. Refer now to FIG. 5, which illustrates another embodiment of a pixel sensor according to the present invention. Pixel sensor 120 includes a memory 121 that is used to store a value from counter 122 and provide that value on bit bus 106 during the readout process. In this embodiment, the readout also includes a first phase in which node 102 is reset to a potential near $V_{dd}$ by placing reset gate 192 in the conducting state while leaving photodiode 197 isolated from node 102. The potential on node 102 is then digitized in a manner analogous to that described above. The result of the digitization is held in counter 122 until it is transferred to memory 121 prior to the start of the second phase. A first ramp is used during the digitization in the first phase.

In the second phase, the charge stored on photodiode 197 is transferred to node 102 and digitized using a second ramp. The final digital value corresponding to that charge is left in counter 122. Again, all pixels in the camera area are processed in parallel using the same ramps. The values stored in the various pixel sensors are readout onto the corresponding bit buses 106 in two readout phases. In the first phase, the values stored in memory 121 are readout. In the second phase, the values stored in counter 122 are readout by row select circuit 125. The two values are then combined to provide the pixel value representing the light exposure for the pixel in question that is corrected for variations in the reset potential on node 102.

The optimal form for the ramp used to digitize the reset voltage on node 102 will, in general, be different from the ramp used to digitize the actual pixel value. The reset voltage on node 102 is ideally $V_{dd}$; however, due to noise in the system, the actual reset voltage differs slightly from this ideal value. Denote the smallest reset voltage that is expected by $R_{min}$ and the largest by $R_{max}$. Using a ramp that increases linearly from zero to a voltage slightly above $V_{dd}$ is less than optimum, since the all of the pixels will generate counts that differ by a small number corresponding to the range of voltages around $V_{dd}$. If the increase in the ramp voltage corresponding to one count in counter 122 is denoted by DV, the counts will range from $R_{min}$/DV to $R_{max}$/DV. In essence, all of the range below $R_{min}$ is wasted. This results in a decrease in accuracy for the measured reset voltage and a waste of time while waiting for the ramp to increase to $R_{min}$. As noted above, minimizing the time over which node 102 is subjected to noise is an important factor in reducing the overall noise in the image.

A better ramp for measuring the reset voltage would be one that starts at a value just below $R_{min}$ and has its maximum count corresponding to a voltage at or just above $R_{max}$. If the same number of counts are used, i.e., the full range of counter 122, then the accuracy with which the reset voltage is known is significantly improved.

In one aspect of the present invention, the ramp used to digitize the signal from photodiode 197 is a non-linear, or a piecewise linear ramp. The value of the signal obtained by transferring the electrons stored on photodiode 197 to node 102 after node 102 has been reset can, in principle, vary from a value near zero to $V_{dd}$. If this range is covered using a linear ramp, the digitization noise for signal values near zero can be significant.

For the purposes of this discussion, an ADC is defined to be a circuit that converts an analog signal between a minimum voltage and a maximum voltage to a digital value between 0 and N−1. For convenience, it will be assumed that the minimum voltage is 0, and the maximum voltage is $V_{dd}$. All input voltages that are between 0 and $V_{dd}$/N are converted to a digital value of 0, input voltages between $V_{dd}$/N and $2V_{dd}$/N are converted to a digital value of 1, and so on. Hence, the signal value represented by any given output digital value may be in error by as much as $\pm V_{dd}/(2N)$. This error will be referred to as digitization noise in the following discussion. The digitization noise depends on the number of steps provided by the ADC. Hence, the digitization noise could, in principle, be lowered by increasing N. However, there is a practical limit to the size of N. In addition, the size of counter 122 and memory 121 increases with the size of N, and hence, the fill factor for the pixel sensor decreases with increasing N, unless larger CMOS dies are used to construct the imaging array.

In the case of the ramp used to digitize the reset voltage, the digitization noise is $(R_{max}-R_{min})/2N$. Since $R_{max}$ is close to $R_{min}$, the digitization noise in the reset voltage measurement is often negligible. Hence, the goal of utilizing a non-linear ramp applies mainly to the measurement of the signal generated by the photodiode in each pixel sensor.

In many applications, the error measurement of interest is the error as a percentage of the total pixel signal value. For example, the human eye cannot detect small percentage differences in intensity. Hence, in an image that is to be viewed by a human observer, the digitization noise will be masked by the lack of sensitivity of the eye once the noise is reduced to some predetermined percentage of the pixel signal value. Low light values correspond to higher signal values at node 102, since the number of photoelectrons transferred to node 102 will be small, and hence, the potential at that node will remain near the reset potential. Accordingly, a ramp that has a smaller slope at values near $V_{dd}$ than at values near zero provides the desired property. The ramp could be piecewise linear or a function that changes slope over time in a continuous manner. By altering the slope as a function of time, the range of the ADC can be extended without requiring larger counters or conversion times. Since the shape is known to the controller in the camera or imaging array, the conversion back to a linear intensity scale can be performed after the image is off-loaded from the pixel sensors.

Figure 6:
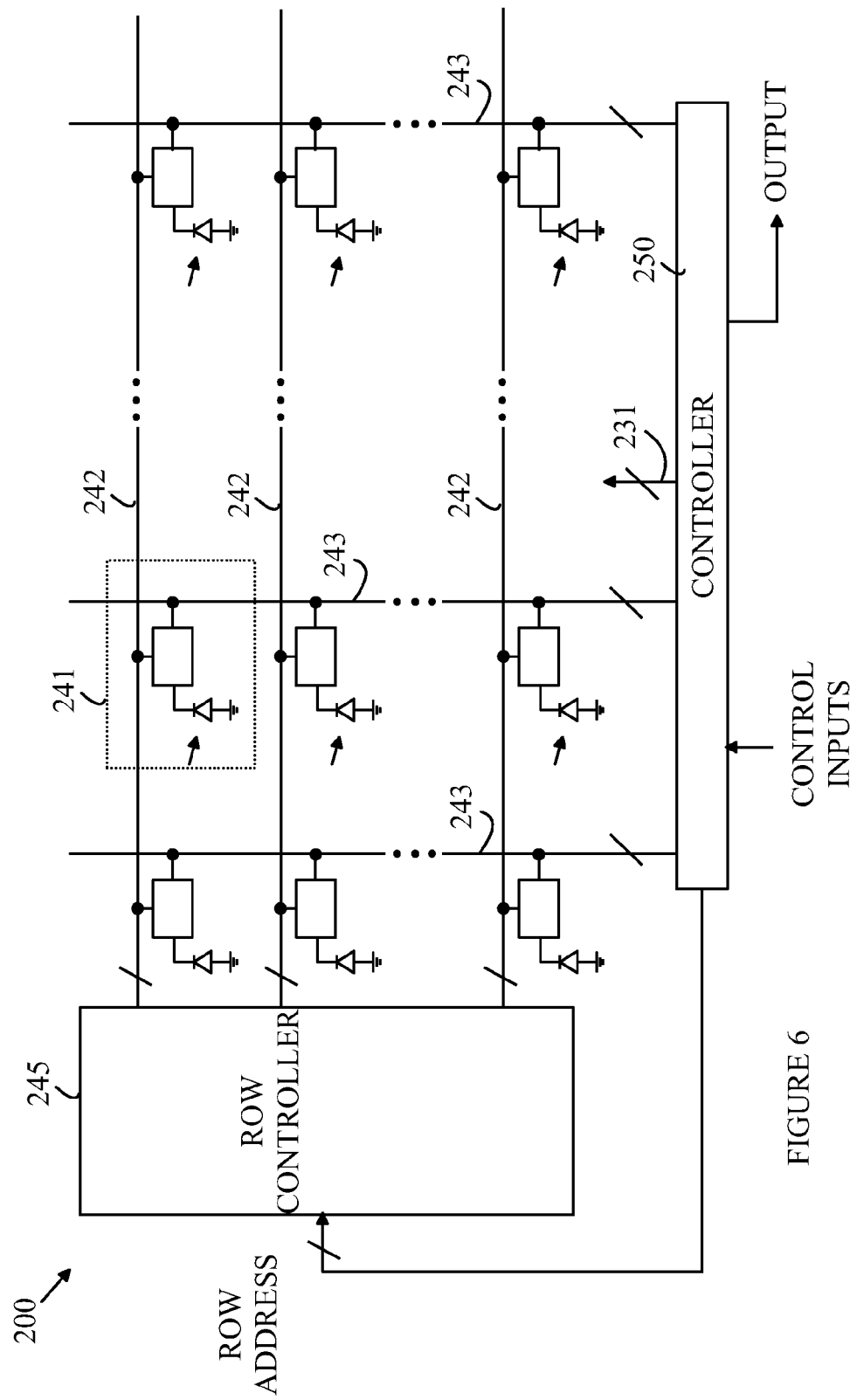
FIG. 6 illustrates an imaging array according to one embodiment of the present invention.

Refer now to FIG. 6, which illustrates an imaging array according to one embodiment of the present invention. Imaging array 200 includes a plurality of pixel sensors such as pixel sensor 241. The pixel sensors are organized as a plurality of rows and columns. The pixel sensors in each row are connected to a corresponding row bus 242, and the pixel sensors in each column are connected to a corresponding column bus 243.

Figure 7:
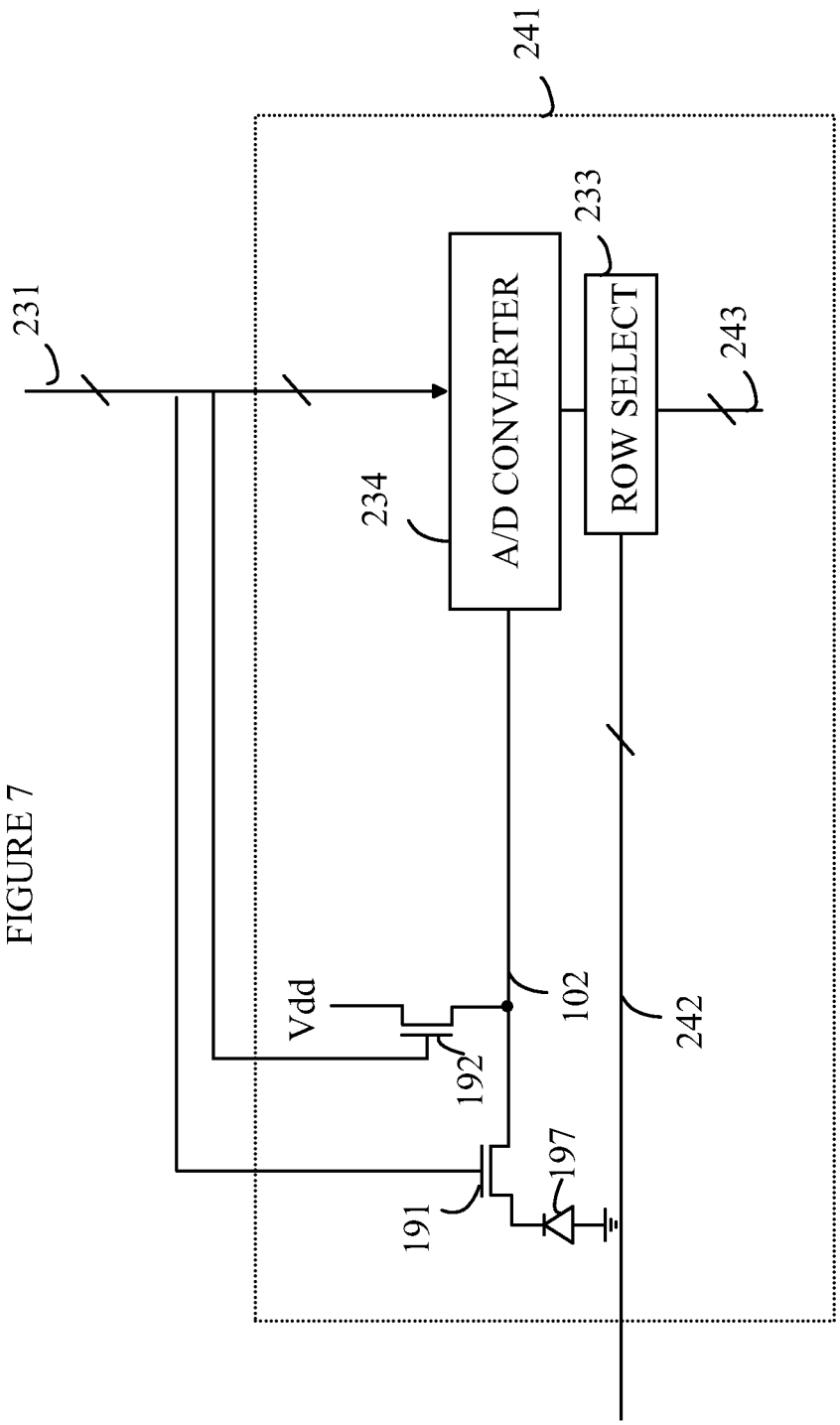
FIG. 7 is a more detailed view of pixel sensor 41.

Refer now to FIG. 7, which is a more detailed view of pixel sensor 241. Pixel sensor 241 includes a photodiode 197 that can be connected to node 102 by transfer gate 191. Node 102 is can also be connected to $V_{dd}$ by reset gate 192. The voltage on node 102 is digitized by ADC 234 in a manner analogous to that described above. Any of the embodiments discussed above can be utilized for ADC 234. ADC 234 can include storage for the result of one of the conversions as well as the counter discussed above. ADC 234 is controlled from conductors in bus 231. The specific control lines will depend on the specific embodiment of the ADC. Conductors from this bus also supply the control signals that operate transfer gate 191 and reset gate 192. It should be noted that bus 231 is connected to all pixels in imaging array 200 and controls operations that are performed in parallel in each pixel sensor. This bus can be operated from controller 250 as is the case for imaging array 200 or from circuitry that is not part of imaging array 200. To simplify FIG. 6, the connections between bus 231 and the individual pixel sensors have been omitted from the drawing. The circuitry that generates the ramp and clock signals is part of controller 250 in this embodiment. However, that circuitry could be external to controller 250.

The readout operations are controlled by the row buses shown at 242. Each pixel sensor 241 includes a row select circuit 233 that connects the digital value or values stored in the attached ADC to the corresponding column bus 243. The exact structure of the row select circuits will in general depend on the number of storage elements in ADC 234. For example, if ADC 234 includes both a counter and a memory as shown in FIG. 5, row select circuit will include gates for separately connecting the counter and the memory to column bus 243 in response to a signal on row bus 242. The row buses are driven by a row controller 245. Row controller 245 receives a row address from controller 250 and provides the relevant control signals to the row selectors in the row identified by that row address.

Imaging array 200 does not require an external shutter. Just prior to the beginning of an exposure, all of the pixel sensors can be reset by connecting the photodiodes in each pixel sensor to $V_{dd}$ by placing transfer gate 191 and reset gate 192 in their conducting states. As long as the photodiodes are so connected, any photoelectrons generated by light from the image projected on imaging array 200 will be removed from the photodiodes. The exposure can then be started by isolating the photodiodes by closing transfer gates 191 in all of the pixels. During the exposure, node 102 can be held at $V_{dd}$ by leaving reset gate 192 in the conducting state in all of the pixel sensors. Just prior to the end of the exposure, reset gate 192 is closed. If correlated double sampling is being implemented in imaging array 200, the potential on node 102 is digitized by ADC 234 and stored in ADC 234. Transfer gate 191 is then placed in the conducting state for a period of time sufficient to sweep all of the photoelectrons that have accumulated in the photodiode 197 onto node 102. Transfer gate 191 is then closed and the voltage on node 102 digitized. The pixel sensors are then readout one row at a time by controller 250.

Controller 250 can perform additional functions related to generating the actual image, or these functions can be performed by a separate controller that is external to imaging array 200. For example, if correlated double sampling is utilized, controller 250 can correct for fluctuations in the reset voltage on node 102 if that correction has not been done in the individual pixel sensors.

In addition, controller 250 can correct for variations in the ADCs in imaging array 200. The above-described embodiments assume that all of the ADCs are identical. However, there may be variations in threshold values in the comparators. For example, the comparators may include an amplification stage that provides the high input impedance needed to digitize the voltage on node 102 without significantly depleting the charge stored on node 102. Differences in the amplification stages from pixel sensor to pixel sensor can result from different gains in the amplification stages, leading to differences in the amount by which the voltage on node 102 must be less than the ramp voltage to stop the counter in the ADC. These differences in threshold value can be measured by exposing the array to a uniform light source and measuring the counter outputs for varying lengths of exposures. A count increment or decrement for each pixel can then be derived. Controller 250 can store this calibration map and make the required count alterations at the end of each exposure.

The above-described embodiments of imaging arrays according to the present invention utilize an array of pixel sensors that are arranged as a plurality of rows and columns in which the digitized pixel values are readout one row at a time via a plurality of column buses. However, other arrangements could also be utilized. Typically, the final image will be readout one pixel value at a time from the controller in the imaging array. Since the pixel values have all been digitized and stored in the individual pixel sensors, there is no need to speedup the readout from the pixel sensors to the controller to reduce noise. In applications in which the time between exposures is sufficient to allow the readout of the pixel sensors to the final storage location for the image, little is gained by reading out the pixel sensors in parallel, since a row will be stored in the controller while the row is readout one value at a time to the image storage memory in the camera. In such embodiments, all of the pixel sensors can be readout on a single readout bus, one pixel sensor at a time. The specific pixel sensor that is readout at any given time is determined by a token that is passed from sensor to sensor on the bus.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
a plurality of pixel sensors, each pixel sensor comprising:
a photodiode,
a transfer gate that connects said photodiode to a floating diffusion node that accumulates noise when said floating diffusion node is floating, said floating diffusion node being connected to said photodiode in response to a transfer gate signal;
a reset gate that connects said floating diffusion node to a reset voltage in response to a reset gate signal;
an analog-to-digital converter (ADC) connected to said floating diffusion node, said ADC converting a voltage on said floating diffusion node to a digital value;
an output circuit that connects said ADC to a bit bus; and
a controller that causes said ADCs to operate in parallel to convert said voltages on said floating diffusion nodes to said digital values in a time that is less than the time needed for said floating diffusion node to acquire ten electron equivalents of noise.

2. The apparatus of claim 1 wherein said time is less than the time needed for said floating diffusion node to acquire three electron equivalents of noise.

3. The apparatus of claim 1 wherein said time is less than the time needed for said floating diffusion node to acquire one electron equivalent of noise.

4. The apparatus of claim 1 wherein each of said ADCs comprises:
a comparator that compares said voltage on said floating diffusion node to a ramp signal and generates a stop clock signal when said ramp signal reaches a predetermined relationship with said voltage on said floating diffusion node; and a counter that counts clock pulses, said counter being reset by a first counter control signal and said counter stops counting said clock pulses in response to said stop clock signal being generated, wherein said output circuit causes a count generated in said counter to be readout on said bit bus in response to a readout control signal.

5. The apparatus of claim 4 wherein said ADC in each pixel sensor converts said voltage on said floating diffusion node in said pixel sensor after said floating diffusion node has been connected to said reset voltage and before said photodiode in said pixel sensor is connected to said floating diffusion node, said digital value being stored in said pixel sensor as a reset digital value, said ADCs using a first ramp signal as said ramp signal during said conversion.

6. The apparatus of claim 5 wherein said ADC in each of said pixel sensors converts said voltage on said floating diffusion node to a signal digital value in said pixel sensor after said floating diffusion node has been connected to said reset voltage and then connected to said photodiode, said ADC using a second ramp signal as said ramp signal during said conversion.

7. The apparatus of claim 6 wherein each pixel sensor combines said reset signal value and signal digital value to form a corrected digital value for that pixel sensor.

8. The apparatus of claim 6 wherein said first ramp signal has a different slope than said second ramp signal.

9. The apparatus of claim 5 wherein said reset digital value is stored in said counter.

10. The apparatus of claim 5 wherein said reset digital value is stored in said counter.

11. The apparatus of claim 6 wherein both said reset digital value and said signal digital value are readout on said bit bus.

12. A method for generating a digital image, said method comprising:
providing a plurality of pixel sensors, each pixel sensor comprising:
a photodiode corresponding to a predetermined pixel in said digital image; and
an ADC that converts a voltage on a floating diffusion node in said pixel sensor to a digital value;
causing each of said pixel sensors to convert a voltage on said floating diffusion node in that pixel sensor to said digital value in a time that is less than the time needed for said floating diffusion node to acquire ten electron equivalents of noise.

13. The method of claim 12 wherein said time is less than the time needed for said floating diffusion node to acquire three electron equivalents of noise.

14. The method of claim 12 wherein said time is less than the time needed for said floating diffusion node to acquire one electron equivalent of noise.

15. The method of claim 12 wherein said ADCs compare a voltage on said floating diffusion node to a ramp signal during said conversion.

16. The method of claim 15 wherein each of said pixel sensors uses a first ramp signal as said ramp signal to generate a reset digital value that is indicative of a voltage on said floating diffusion node in that pixel sensor generated when said floating diffusion node is connected to a reset voltage prior to said floating diffusion node being connected to said photodiode in that pixel sensor.

17. The method of claim 16 wherein each of said pixel sensors uses a second ramp signal as said ramp signal to generate a signal digital value indicative of a voltage on said floating diffusion node in that pixel sensor after said floating diffusion node is connected to photodiode.

18. The method of 17 wherein said first ramp signal has a different slope than said second ramp signal.

19. The method of claim 17 wherein said reset digital value and said signal digital value are stored in said pixel sensor in which said reset digital value and said signal digital value were generated.

20. The method of claim 17 further comprising combining said reset digital value and said signal digital value to generate a corrected signal value.

21. The method of claim 20 wherein said combining occurs in each of said pixel sensors.

* * * * *